Figure 1:
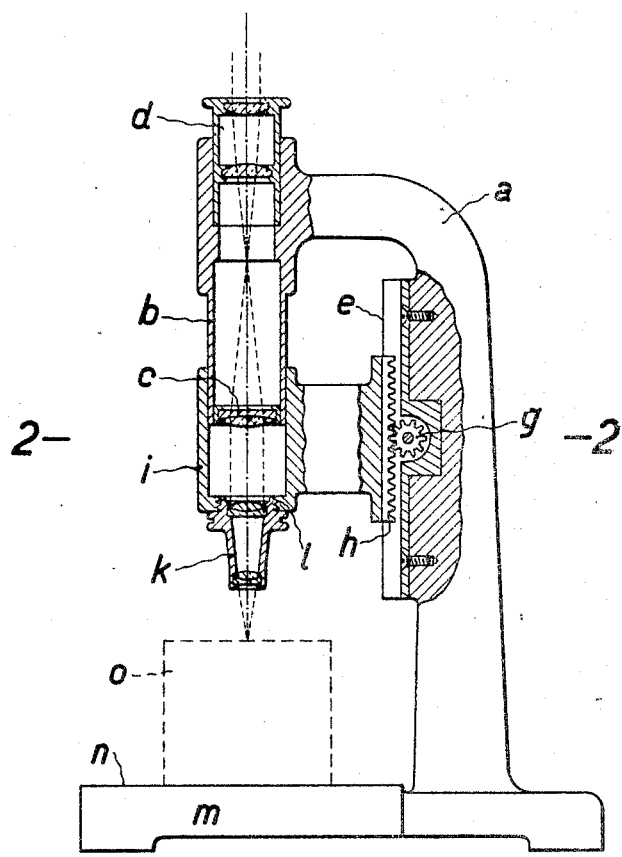

Nov. 15, 1927. 1,649,068

A. KÖHLER

MICROSCOPE

Filed March 31, 1925

Inventor:
August Köhler

Patented Nov. 15, 1927.

1,649,068

UNITED STATES PATENT OFFICE.

AUGUST KÖHLER, OF JENA, GERMANY, ASSIGNOR TO THE FIRM CARL ZEISS, OF JENA, GERMANY.

MICROSCOPE.

Application filed March 31, 1925, Serial No. 19,697, and in Germany April 16, 1924.

It is customary in microscopes, which are provided with a tube, containing the optical parts, and a stage for the reception of the object, to render the whole tube displaceable relatively to the stage, in order to enable the observer to adjust with objectives having a different free working distance to sharp images of the surface, facing the objective, of a more or less thick object. If it be desired to examine objects of a thickness varying within practically wide limits, it is suitable to also render the stage itself movable in the same direction. However, on the one hand, it is always desirable to support the object as firmly as possible, e. g. on a fixed stage and on the other hand, an adjustment of the tube, possible within very wide limits, has the drawback that the observer will be obliged in one case, whilst in a sedentary position, to bend down his head, in another case to work in standing in an uncomfortable position in order to be able to keep his eye-pupil in the exit pupil of the ocular.

The subject of the invention is a microscope which does not have the aforesaid drawbacks, viz, a microscope of that kind in which the objective acts as a magnifying lens, i. e. it is aplanatic for its front focal point. If it be desired to obtain with such a microscope images which are as free as possible from imaging defects, it is, of course, necessary to always adjust the objective relatively to the object in such a way that the surface of the object to be imaged by the objective lies in its front focal plane and therefore its image at a great distance. For the observation of this image one uses a telescope which is adjusted to a large distance, the position of which telescope being within wide limits independent of the position of the objective. As a rule, this telescope is so disposed that its optical axis coincides with that of the microscope objective. By basing on such a construction of the microscope the problem in question can be solved if the microscope be constructed according to the invention in such a way that the telescope, used for observing the image presented by the magnifying lens, has an invariable position relatively to the surface determined for the reception of the object to be examined, whilst the objective of the microscope is movable in the direction of the optical axis of the telescope. The reception of the object to be examined by this surface may take place either indirectly or directly. As a surface destined for the direct reception may serve, provided the objects are of a shape and size fit for laying-on, for instance the surface of a fixed stage, or the surface can be determined by the supports of the microscope foot if the microscope be adapted to be placed upon the object to be examined. However, the case of indirect reception of the object to be examined exists if one uses a special device supported on a fixed surface in order to impart to the object certain definite possibilities of displacement (e. g. revolving stage, mechanical stage, spherical stage etc.). In this sense may, for instance, also be understood the bearing surface of a pivot, which perpendicularly intersects the optical axis of the microscope and about which a tiltable stage can be turned, as a surface destined for the indirect reception of the object.

Figure 2:
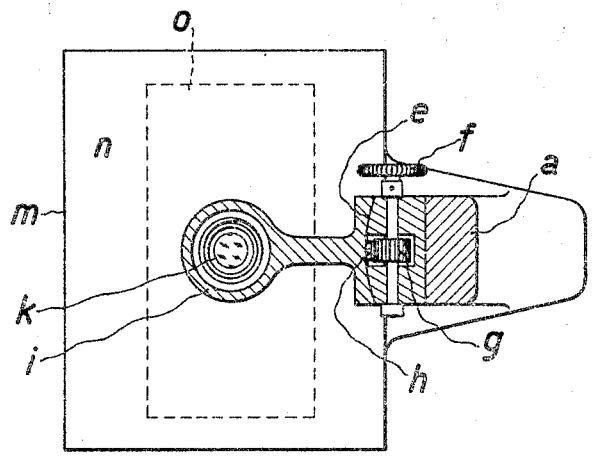

The annexed drawing shows a constructional example of the subject of the invention. Fig. 1 shows, partly in a section, an elevation, Fig. 2 a section on the line 2—2 of Fig. 1 in a plan elevation.

At the upper end of a stand $a$ there is provided a tubular extension $b$ into whose lower part is inserted a telescope objective $c$, whilst the upper end receives a microscope ocular $d$. The focal length of the optical parts is so chosen that the objective $c$ forms with the ocular $d$ an astronomical telescope adjusted to a great distance. On the tubular casting $b$ is displaceable in the direction of the optical axis of the telescope along a guide $e$, fitted to the stand $a$, by means of a pinion $g$ and a rack $h$ a tube $i$, provided with a screw thread $l$ for the reception of a microscope objective $k$ which is aplanatic for its front focal point. At the foot of the stand $a$ is disposed a table $m$, whose surface $n$ is perpendicular to the optical axis of the microscope and serves for placing thereon the objects $o$ to be examined.

When using the new microscope it is necessary to place the object $o$ on the stage and, whilst simultaneously observing through the ocular $d$, to sharply focus on the surface of the object $o$ to be examined by raising and lowering the tube $i$ by means of the milled head $f$. On displacing the tube $i$ the ocular $d$ retains its position and the position of the head of the observer remains the same, irrespective of the height of the object to be examined.

I claim:

Microscope comprising a stand, an objective and a telescope, the objective being aplanatic for its front focal point, guiding means connecting the stand and the objective and allowing of displacing the objective along the stand in the direction of its optical axis, the said telescope having an invariable position on the stand behind the said objective, and means for displacing the objective relative to the stand.

AUGUST KÖHLER.